Figure 1:
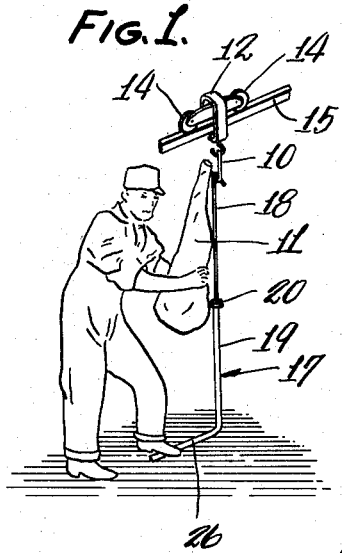

July 5, 1960 S. J. BENDIK 2,943,581
STEADYING DEVICE
Filed May 10, 1955

INVENTOR.
STEPHEN J. BENDIK
BY
ATTORNEY

United States Patent Office 2,943,581
Patented July 5, 1960

2,943,581

STEADYING DEVICE

Stephen J. Bendik, 153 Penn Ave. N.W.,
Warren, Ohio

Filed May 10, 1955, Ser. No. 507,243

2 Claims. (Cl. 105—150)

My invention relates to steadying devices, particularly to such devices for steadying a shiftably mounted hook which supports a bulky object, and the principal object of my invention is to provide new and improved devices of this character.

The device of my invention is particularly useful for steadying a meat hook and, although the following disclosure will describe the invention in use with a meat hook, it will be apparent that the improved device has other uses not specifically disclosed.

In the storage and transportation of large meat portions, such as quarters of beef and the like, the meat is frequently supported on a shiftably mounted hook which may or may not be mounted on a carriage movable along a track.

Great difficulty has been encountered in positioning meat (or other bulky objects) on or removing it from the hook because of the shiftable mounting of the latter. In the event one person attempts to position meat on or remove it from the hook, a lot of maneuvering is required since the hook is not held rigidly and thus the operations are difficult because the bulk and weight of the meat requires use of both hands in supporting it. Quite frequently, two persons are required for the aforesaid operations, one to steady the hook and the other to handle the bulky object, and obviously this is wasteful procedure.

My invention provides an inexpensive device which enables one person to position a bulky object on or remove it from a shiftably mounted support or hook without the complicated maneuvering and consequent strain on the person and, accordingly, replaces the necessity of a two person operation with the resultant savings in cost of labor.

Figure 2:
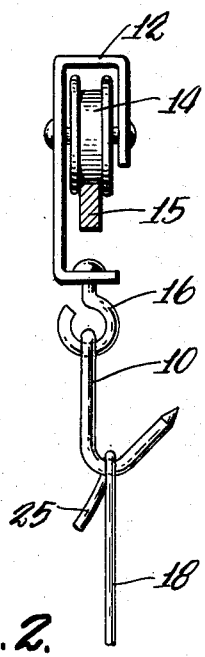
Figure 3:
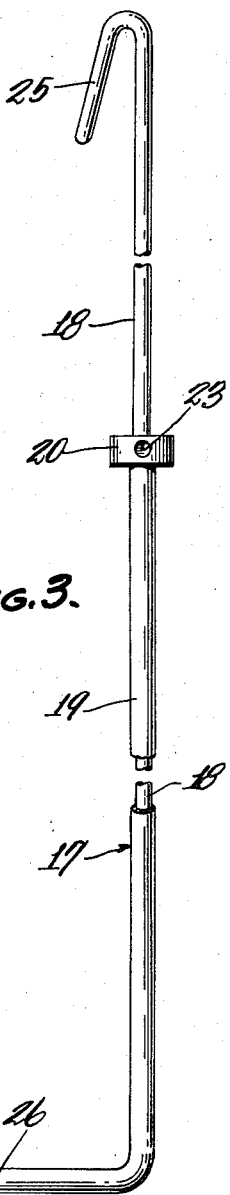
Figure 4:
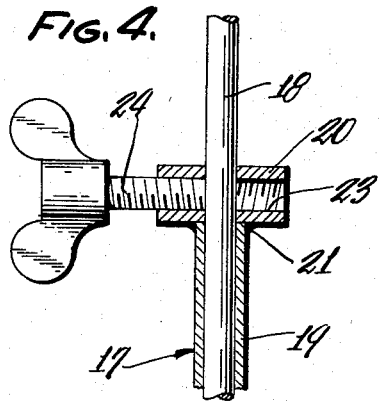

In the drawing accompanying this description and forming a part of this specification, there is shown, for purposes of illustration, an embodiment which my invention may assume, and in this drawing:

Figure 1 is a small scale perspective view illustrating an embodiment of the invention in use, Figure 2 is a broken, side elevation of the embodiment drawn to a larger scale, the track for movably supporting the hook being shown in section, Figure 3 is an enlarged, broken, front elevation of the embodiment, the carriage and track being omitted, and Figure 4 is an enlarged fragmentary sectional view of a detail.

In usual practice a hook 10 or equivalent member is provided to support the bulky object 11, the hook being shiftably mounted in any suitable manner. In the transportation and storage of meat, for example, it is customary to mount the hook on a carriage 12 having wheels 14 for rolling engagement with a track 15. Thus, the meat supported by the hook 10 may be easily moved from place to place along the track.

However, since the hook is shiftably mounted (by reason of the eye connection 16 and the movable carriage 12) great difficulty is encountered in disposing the meat on the hook or removing it from the hook and injuries to workmen have resulted unless two men are employed for such operations.

Generally, my invention provides a member having a first portion engageable with the meat supporting hook and a second portion restrained from movement, whereby the hook is held against shifting in any substantial amount.

In the embodiment of the invention herein disclosed, the improved steadying device comprises a rigid elongated member 17 comprising an upper portion 18 and a lower portion 19 which are relatively extensible and retractable to accommodate meat supporting hooks at various elevations.

Preferably, although not necessarily, the lower portion 19 is formed of a metallic tube and the upper portion 18 is a tube or rod which telescopically fits within the tube 19. A collar 20 may be secured to the upper end of lower portion 19 in any suitable manner, as by welding shown at 21. The collar 20 has a central opening 22 to pass the upper portion 18 and a transverse threaded aperture 23 preferably extending diametrically through the collar for receiving a threaded securing element from either side of the aperture 23.

Any suitable means may be provided for securing the portions 18 and 19 in selected adjusted relation and, in the presently disclosed embodiment, such means take the form of the threaded aperture 23 in the collar 20 and a wing bolt 24. It will be appreciated that the wing portion of the bolt 24 may be replaced by a lever or the like in the event increased holding force is required.

The upper end of the portion 18 is provided with means for engaging the meat supporting hook 10 and, as presently preferred, such upper end is turned downwardly and laterally to provide a hook 25 which is readily engageable over the meat supporting hook 10 and which tends to hold the hook against turning in the supporting eye of the carriage 12.

The lower end of the portion 19 is provided with a foot rest 26 adapted for engagement with the floor or like surface. In the presently disclosed embodiment, the lower end of portion 19 is bent laterally to provide the foot rest, and such laterally bent end may be stiffened in any suitable manner, if desired or found necessary.

Assuming that a bulky portion of meat is supported from the hook 10 and that it is desired to remove such meat from the hook, an operator may first engage the hook 25 over the meat supporting hook 10 and then adjust the portions 18 and 19 to a fixed relation wherein the foot rest 26 engages the floor. The operator then places a foot over the foot rest to form a rigid line of connection from the meat supporting hook 10 to the floor, which connection maintains the hook 10 in generally upright position whereby not only is the hook supported against swinging movement about the carriage eye 16 but also the carriage 12 is held against movement along the track 15.

Thus, both hands of the operator are free to engage and handle the meat and the meat may thus be removed from the hook and carried to another position, such as to a cutting block. My improved steadying device will remain in position supported from the hook 10 and may be used to position another bulky portion of meat on the hook 10 in a manner which will now be obvious, or it may be removed and stored for further use.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. The method of attaching a heavy and bulky object into hanging engagement with a depending swingable hook by a person and which normally requires the use of both hands of the person in lifting the object, comprising the steps of first attaching one end of a readily detachable elongated element to the swingable hook, secondly placing one foot of the aforesaid person on a foot receiving portion located at the other end of said element, thirdly forcing the foot downwardly against the foot receiving portion to exert a downward force on said element whereby the swingable hook is held comparatively stationary, and fourthly attaching the bulky object to the depending swingable hook.

2. The method of manually detaching a heavy and bulky object from hanging engagement with a swingable hook by a person and normally requiring the use of both hands of the person in lifting and detaching the object from the hook, comprising the steps of first attaching one end of a readily detachable elongated element to the swingable hook, secondly placing one foot of the aforesaid person on a foot receiving portion located at the other end of said element, thirdly forcing the foot downwardly against the foot receiving portion to exert a downward force on said element whereby the swingable hook is held comparatively stationary, and fourthly detaching the bulky object from the swingable hook.

References Cited in the file of this patent

UNITED STATES PATENTS

| | | |
|---|---|---|
| 179,127 | Norcross | June 27, 1876 |
| 576,279 | Schleese | Feb. 2, 1897 |
| 924,291 | Swann | June 8, 1909 |
| 927,724 | Haynes | July 13, 1909 |
| 1,130,191 | O'Brien | Mar. 2, 1915 |
| 2,488,312 | Millican | Nov. 15, 1949 |
| 2,498,006 | Ridill | Feb. 21, 1950 |
| 2,505,885 | Davis | May 2, 1950 |
| 2,528,077 | Pond | Oct. 31, 1950 |
| 2,583,913 | Weiterschan | Jan. 29, 1952 |
| 2,653,785 | La Russa | Sept. 29, 1953 |
| 2,661,179 | Rose | Dec. 1, 1953 |
| 2,690,319 | Forsythe | Sept. 28, 1954 |
| 2,724,342 | Anderson et al. | Nov. 22, 1955 |
| 2,761,394 | Cantrell et al. | Sept. 4, 1956 |

FOREIGN PATENTS

| | | |
|---|---|---|
| 581,821 | France | Oct. 3, 1924 |